United States Patent [19]
Watanabe et al.

[11] Patent Number: 5,757,733
[45] Date of Patent: *May 26, 1998

[54] OPTICAL DISC SYSTEM HAVING AN OBJECTIVE LENS WITH A NUMERICAL APERTURE RELATED TO THE THICKNESS OF THE PROTECTIVE LAYER

[75] Inventors: Tetsu Watanabe; Yoshio Aoki, both of Tokyo, Japan

[73] Assignee: Sony Corporation, Tokyo, Japan

[*] Notice: The term of this patent shall not extend beyond the expiration date of Pat. No. 5,392,263.

[21] Appl. No.: 613,035

[22] Filed: Mar. 8, 1996

Related U.S. Application Data

[60] Continuation of Ser. No. 383,351, Feb. 3, 1995, Pat. No. 5,533,001, which is a division of Ser. No. 277,357, Jul. 19, 1994, Pat. No. 5,392,263, which is a continuation of Ser. No. 761,874, Sep. 13, 1991, abandoned.

[30] Foreign Application Priority Data

Jan. 31, 1990 [JP] Japan ..................................... 2-21210

[51] Int. Cl.$^6$ ............................................... G11B 11/00
[52] U.S. Cl. ........................................ 369/13; 369/275.5
[58] Field of Search ................................. 369/275.2, 13, 369/14, 110, 275.1, 275.5; 360/59, 114; 365/122

[56] References Cited

U.S. PATENT DOCUMENTS

| | | | |
|---|---|---|---|
| 4,807,204 | 2/1989 | Mizutani et al. | 369/13 |
| 4,922,454 | 5/1990 | Taki | 369/13 |
| 4,926,403 | 5/1990 | Tsuyuguchi et al. | 369/13 |
| 5,197,049 | 3/1993 | Wehrenberg | 369/13 |
| 5,202,880 | 4/1993 | Lee et al. | 369/275.2 |
| 5,276,674 | 1/1994 | Tanaka | 369/275.3 |
| 5,287,334 | 2/1994 | Iwabuchi et al. | 369/13 |

*Primary Examiner*—Tan Dinh
*Attorney, Agent, or Firm*—Jay H. Maioli

[57] ABSTRACT

A magneto-optical disc system includes a magneto-optical disc 40 with a light-transmitting cover layer 41, an objective lens 2 for bundling or focusing a laser beam onto a magnetic recording layer 43 of the magneto-optical disc 40 for recording information thereon and/or reproducing information therefrom, and a magnetic field generating unit 9 having a coil pattern 7 arranged on an optical glass element 8. The thickness $t_2$ of the light-transmitting cover layer 41 falls within the range of 0.6 to 0.1 mm, and the numerical aperture (NA) of the objective lens 2 falls within the range of 0.55 to 0.70.

12 Claims, 4 Drawing Sheets

OPTICAL DISC SYSTEM HAVING AN OBJECTIVE LENS WITH A NUMERICAL APERTURE RELATED TO THE THICKNESS OF THE PROTECTIVE LAYER

This is a Continuation of application Ser. No. 08/383,351 filed Feb. 3, 1995 U.S. Pat. No. 5,533,001, which is a Divisional of application Ser. No. 08/277,357 filed Jul. 19, 1994, now U.S. Pat. No. 5,392,263 which is a Continuation of application Ser. No. 07/761,874, filed Sep. 13, 1991 now abandoned.

TECHNICAL FIELD

The present invention relates to optical and magneto-optical disc systems for performing recording and/or reproduction of an information signal, and optical and magneto-optical discs used in these systems.

BACKGROUND ART

A magneto-optical disc system utilizing a magneto-optical effect is shown in FIG. 1 as an optical disc system for performing recording in and/or reproduction from an optical recording medium such as an optical disc or a magneto-optical disc.

A conventional magneto-optical disc system shown in FIG. 1 is arranged such that when a disc-like one-sided magneto-optical recording medium 50 is mounted, an optical system including a laser unit 58, an objective lens 59, and the like is arranged above the one-sided magneto-optical recording medium 50, and a magnetic field generation unit 60 serving as a magnetic system is arranged below the one-sided magneto-optical recording medium 50. A numerical aperture (to be referred to as an NA hereinafter) of the objective lens 59 is set to fall within the range of 0.50 to 0.53.

In order to drive the optical system in focusing and tracking directions with respect to the magneto-optical recording medium 50, a drive system (not shown) is arranged. Another drive system (not shown) is arranged to drive the magnetic system in a direction indicated by an arrow in FIG. 1 and the tracking direction.

In this magneto-optical disc system, a magnetic field modulation scheme is employed to perform recording. In this magnetic field modulation scheme, high-speed reverse control of a magnetic field must be performed in accordance with an information signal to be recorded. For this reason, a sufficiently large excitation current cannot be obtained. The intensity of the magnetic field generated by the magnetic field generation unit is limited. The magnetic field generation unit 60 is located near a magnetic recording layer 53 (to be described later) in the one-sided magneto-optical recording medium 50. An overwrite operation can be performed according to the magnetic field modulation scheme.

The one-sided magneto-optical recording medium 50 is formed as follows. A dielectric layer 52, a magnetic recording layer 53 having a large mangeto-optical effect and made of, e.g., a rare earth element-transition metal alloy amorphous thin film, a dielectric film 54, a reflecting layer 55, a protective cover 56 are sequentially stacked on one surface of a light-transmitting transparent substrate 51 made of, e.g., polycarbonate. The transparent substrate 51 has a predetermined thickness $t_1$. The thickness of a conventional substrate is set to be 1.2 mm.

An operation of the magneto-optical disc system will be described below.

The one-sided magneto-optical recording medium 50 is placed and driven on a rotary disc (not shown), and a magnetic field is applied from the magnetic field generation unit 60 to the magnetic recording layer 53 of the one-sided magneto-optical recording medium 50. High-speed reverse control of the magnetic field to be applied is performed on the basis of an information signal to be recorded. A laser beam emitted from the laser unit 58 is focused through the objective lens 59 on the magnetic recording layer 53 applied with this magnetic field. A change in direction of magnetization occurs in a region of the magnetic recording layer 53 irradiated with the focused laser beam in accordance with the direction of the magnetic field applied from the magnetic field generation unit 60. Therefore, an overwrite operation of an information signal can be performed in real time.

In order to obtain a more compact magneto-optical pickup, which is constituted by the optical system, the magnetic system, and the drive systems for driving the optical and magnetic systems, it is assumed that the optical system may be formed integrally with the magnetic system and both the systems are arranged on the one side of the magneto-optical recording medium. More specifically, the magnetic field generation unit 60 of FIG. 1 is located on the side where the objective lens 59 is located (i.e., the side of the transparent substrate 51). However, since a distance between the magnetic field generation unit 60 and the magnetic recording layer 53 becomes larger than before, a sufficiently high magnetic field cannot be applied to the magnetic recording layer 53.

Along with an increase in information volume in recent years, a two-sided magneto-optical recording media has been developed, in which the magnetic recording layers are formed respectively on both surfaces of one magneto-optical recording medium so as to be capable of recording information signals on each of the surfaces In order to perform recording in and/or reproduction from such two-sided magneto-optical recording media, it is very difficult to apply a sufficiently high magnetic field to each of the magnetic recording layers by means of the magneto-optical pickup of FIG. 1, constituted by the optical and magnetic systems. The reason for this is such that in the magnetic field generation unit of a magnetic field modulation scheme, a high-frequency current corresponding to a high-frequency data signal that is an information signal to be recorded must be supplied to an electromagnetic coil. A current tends to become difficult to flow through an electromagnetic coil as the frequency of the current increases, so that the generated magnetic field is limited. In addition, another reason is that the distance between the magnetic field generation unit and each magnetic recording layer is rather large. Therefore, in state-of-the-art techniques, it is very difficult to perform two-side optomagnetic recording under the magnetic field modulation scheme.

In order to cope with an increase in information volume, more information signals must be recorded in, e.g., a recording portion such as the magnetic recording layer of an optical disc.

DISCLOSURE OF INVENTION

It is, therefore, an object of the present invention to provide a large-capacity optical disc system capable of performing recording and/or reproduction in higher density, and an optical disc used in this optical disc system.

According to an aspect of the present invention, there is provided an optical disc system for recording an information signal in an optical disc and/or reproducing the information signal from the optical disc, the optical disc being provided with a recording layer irradiated with a laser beam to perform recording or reproduction and a light-transmitting cover which is formed to cover the recording layer and through which the laser beam is transmitted, and the optical disc system comprising laser beam generating means for generating the laser beam and an objective lens for bundling or focusing the laser beam on the recording layer through the light-transmitting cover, characterized in that a thickness of the light-transmitting cover of the optical disc falls within a range of 0.6 to 0.1 mm, and a numerical aperture of the objective lens falls within a range of 0.55 to 0.70.

When the laser beam is bundled or focused by the objective lens, the convergent rays have a minimum diameter ($2\omega_0$) represented by equation (1) below:

$$2\omega_0 = 0.82 \times \lambda / NA \quad (1)$$

($\lambda$: wavelength of laser beam)

Since the numerical aperture NA of the objective lens is larger than a value falling within the conventional NA range of 0.50 to 0.53, the minimum diameter of the convergent rays is decreased, so that the recording density is increased. Therefore, reproduction corresponding to this high recording density can be performed.

As the NA is increased, the thickness of the objective lens is increased, but the thickness of the light-transmitting cover of the optical disc is smaller than the conventional thickness (1.2 mm), so that the objective lens having a larger thickness will not be brought into contact with the optical disc.

As the NA of the objective lens and the thickness t of the light-transmitting cover of the optical disc are changed, the aberration values of the objective lens are changed as follows.

(A) Spherical Aberration $W_{40}$ $$W_{40} = \frac{t}{8} \cdot \frac{N^2 - 1}{N^3} \cdot \sin^4\alpha \quad (2)$$

($\sin\alpha = NA$)

(N: refractive index of light-transmitting cover of the optical disc)

(B) Coma $W_{31}$ $$W_{31} = \frac{t}{2} \cdot \frac{(N^2 - 1)N^2 \sin\theta \cos\theta}{(N^2 - \sin^2\theta)^{\frac{5}{2}}} \cdot \sin^3\alpha \quad (3)$$

($\theta$: skew)

The spherical aberration (A) can be corrected by the objective lens and does not pose any decisive problem. If the thickness t of the light-transmitting cover is, however, dispersive, problems may be presented. Therefore, the thickness t is preferably set to fall within the tolerance.

The coma (B) cannot be corrected by the objective lens. It is preferable to make the absolute value of the coma as small as possible. Even if the numerical aperture NA increases, the thickness t of the light-transmitting cover becomes small, so that the absolute value of the coma $W_{31}$ does not become large.

Each aberration of the objective lens scarcely poses any problem even when the numerical aperture NA is increased. According to the optical disc system described above, recording and/or reproduction can thus be performed in higher density than those or that of a conventional system.

According to another aspect of the present invention, there is provided a magneto-optical disc system for recording an information signal in a magneto-optical disc and/or reproducing an information signal from the magneto-optical disc, the magneto-optical disc having a substrate, a magneto-optical recording layer formed on the substrate and irradiated with a laser beam for recording or reproduction, and a light-transmitting cover which is formed to cover the magneto-optical recording layer and through which the laser beam is transmitted, and the magneto-optical recording system comprising laser beam generating means for generating the laser beam, an objective lens for focusing the laser beam on the magneto-optical recording layer through the light-transmitting cover, and magnetic field applying means for applying a magnetic field to the magneto-optical layer, characterized in that the light-transmitting cover of the magneto-optical disc has a thickness falling within a range of 0.6 to 0.1 mm, and a numerical aperture of the objective lens falls within a range of 0.55 to 0.70.

In the system using the optical disc and the magneto-optical disc of this invention, the numerical aperture NA of the objective lens for performing high-density recording or reproduction falls within the range of 0.55 to 0.70, so that the thickness of the light-transmitting cover of the disk, formed to cover the recording layer and transmit the laser beam to the recording layer, is set to fall within the range of 0.6 to 0.1 mm accordingly.

Thus, the optical and magneto-optical recording media capable of performing high-density recording or reproduction can be realized.

In the magneto-optical disc, if a high-permeability layer is formed between the substrate and the magneto-optical layer, vertical magnetic field efficiency is preferably increased.

The magneto-optical disc may have respective recording layers on both sides of the substrate. Such magneto-optical disc as to have the respective recording layers on both the sides can be used in a magneto-optical disc system of this invention. In this system, a pair of optical pickup units, each of which have a laser beam generating means, an objective lens, and a magnetic field applying means, are arranged on opposite sides of a magneto-optical disc so as to face each other.

According to the magneto-optical disc having the recording layers on its both surfaces, and the magneto-optical disc system capable of using this magneto-optical disc, higher-capacity recording and reproduction can be performed.

BEST MODE OF CARRYING OUT THE INVENTION

The first to third embodiments of this invention will be described with reference to FIGS. 2 to 5.

Figure 1:
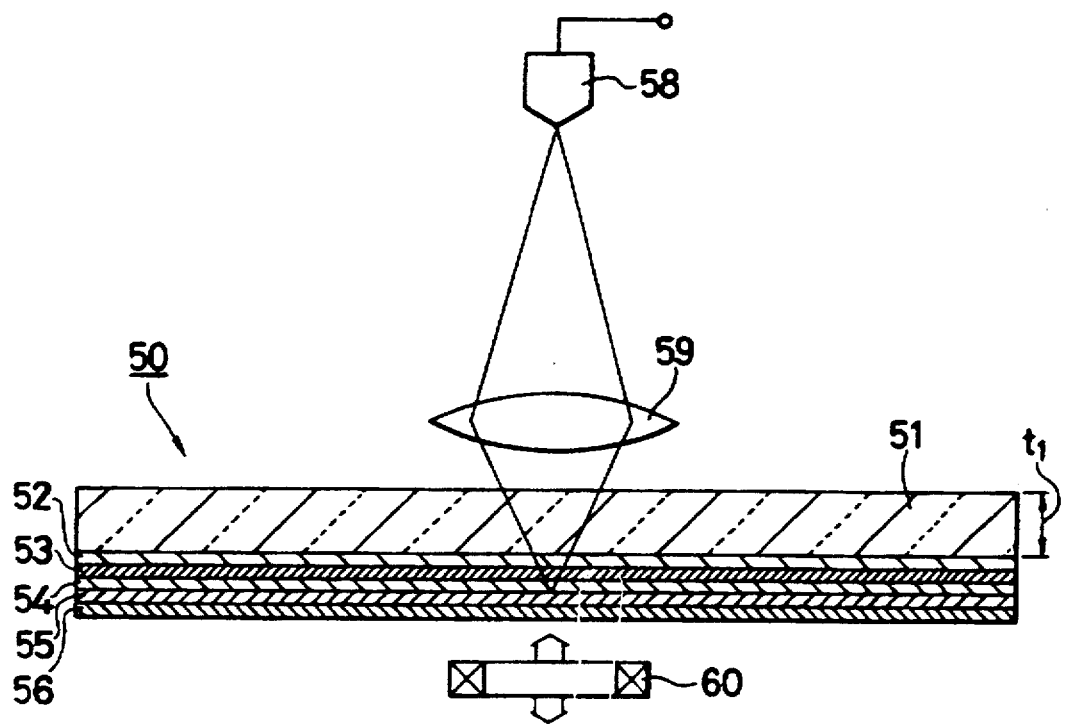
FIG. 1 is a sectional view showing a basic arrangement of a conventional magneto-optical disc system.
Figure 2:
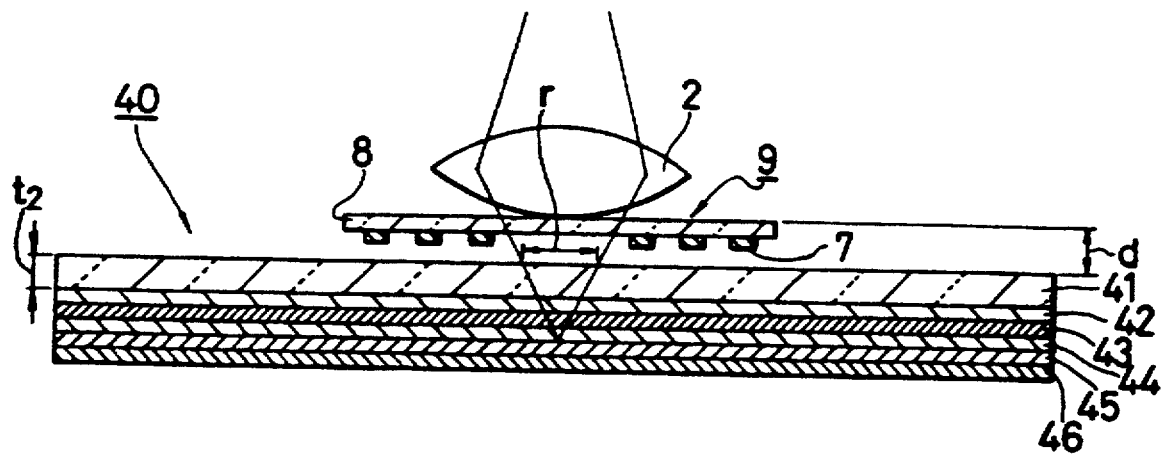
FIG. 2 is a sectional view showing an arrangement of a magneto-optical disc system according to a first embodiment of the present invention.

FIG. 2 is a sectional view showing the first embodiment in which the present invention is applied to a magneto-optical disc system. FIG. 2 shows the basic arrangement of this magneto-optical disc system.

As shown in FIG. 2, this magneto-optical disc system comprises an objective lens 2 having an NA of 0.55 to 0.70 and a magnetic field generating unit 9 constituted by a light-transmitting optical glass 8 having a coil pattern 7.

This magneto-optical disc system is arranged to perform recording and reproduction upon radiating a laser beam of the laser beam unit to a disc-like one-sided magneto-optical recording medium 40, which is obtained by sequentially stacking a dielectric layer 42, a magnetic recording layer 43, a dielectric layer 44, a reflecting film 45, and a protective cover 46 on a thin light-transmitting substrate 41 having a thickness $t_2$ of 0.1 to 0.6 mm, which is smaller than that of the conventional substrate. The magnetic field generating unit 9 employs a magnetic field modulation scheme and applies a magnetic field to the magnetic recording layer 43 (to be described later in detail with reference to FIG. 4).

The thickness of the dielectric layer 42 is much smaller than the thickness $t_2$, so that it will be neglected with respect to the thickness $t_2$.

The objective lens 2 serving as an optical system and the optical glass 8 serving as a magnetic system are bonded and fixed to a bobbin (not shown) to be integrated. The coil pattern 7 is arranged close to the magneto-optical recording medium 40.

Since the thickness $t_2$ of the light-transmitting substrate 41 is much smaller than the thickness of the conventional substrate, and the coil pattern 7 is located near the light-transmitting substrate 41, a distance between the coil pattern 7 and the magnetic recording layer 43 is preferably made small. Since the optical system can be formed integrally with the magnetic system, a magneto-optical pickup unit constituted by these optical and magnetic systems can be made compact and not expensive. Recording in and reproduction from double-sided magneto-optical recording media can be performed as will be described in the second and third embodiments.

In a magneto-optical recording medium used in this magneto-optical disc system, for example, a 3.5" magneto-optical disc is preferably used as a hard disc or is preferably housed in a cartridge holder.

When the NA of the objective lens 2 is increased to fall within the range of 0.55 to 0.70, its focal depth ($=\lambda/NA^2$, $\lambda$: wavelength of laser beam) becomes small. Since the magneto-optical disc is made small as described above, an actuator (not shown) constituting a drive system for the magneto-optical pickup can be made small, and its frequency characteristics can be improved. As this actuator can properly perform tracking control of the magneto-optical pickup, it raises no problem that the focal depth is small.

The spherical aberration $W_{40}$ is corrected by the objective lens 2. As for the coma $W_{31}$, even if the NA of the objective lens is increased as described above, it raises no problem, because the thickness $t_2$ of the light-transmitting substrate is quite small.

Numerical apertures NA and thicknesses t at the time of the coma $W_{31}$ being equivalent to the coma $W_{31}$ at the time when NA of the objective lens is 0.5 and the thickness t of the light-transmitting substrate (light-transmitting cover) is 1.2 mm are obtained in the following four cases.

TABLE 1

| NA | 0.50 | 0.55 | 0.6 | 0.65 | 0.70 |
|---|---|---|---|---|---|
| t (mm) | 1.2 | 0.9 | 0.69 | 0.55 | 0.44 |

As shown in Table 1, if the thickness t is set to fall within the range of 0.6 to 0.1 mm even when the NA range is 0.55 to 0.70, the coma can be suppressed to a level equal to or lower than that of the conventional case, so that no problem raises.

As the NA of the objective lens 2 is increased, the thickness of the objective lens 2 is increased. However, since the thickness $t_2$ of the transparent substrate is small, a distance d (working distance) between the objective lens 2 and the magneto-optical recording medium 40, as shown in FIG. 2, increases more than a predetermined value. The objective lens 2 is not brought into contact with the magneto-optical recording medium 40, and the optical glass 8 can be interposed between the objective lens 2 and the magneto-optical recording medium 40.

Dust is a perplexing problem to an optical disc system can be eliminated when a cartridge or hard disc medium is employed as the magneto-optical recording medium.

The grain size and distribution of the dust are important factors to consider in the performance of the optical disc system. A radius r (FIG. 2) of a circle formed when a laser beam is projected on the transparent substrate 41 is given as follows:

$$r = t \cdot \tan(\arcsin(NA/N)) \tag{4}$$

As is apparent from equation (4), when the thickness t of the light-transmitting cover is decreased, the radius r is also reduced. But the NA is large, so that the radius r cannot be greatly decreased. Therefore, no dust problem is posed in this embodiment.

As described above, in the magneto-optical disc system of this embodiment, the NA of the objective lens is set to fall within the range of 0.55 to 0.70 and, at the same time, the thickness $t_2$ of the light-transmitting substrate (light-transmitting cover) is set to fall within the range of 0.6 to 0.1 mm, so that the recording density can be increased $(0.55/0.50)^2$ to $(0.70/0.50)^2$ times, nearly 1.2 to 2 times larger than that of the conventional system, in which an objective lens having an NA of 0.50 is used, as is apparent from equation (1). All the above-mentioned various problems caused by an increase of NA can thus be apparently solved. Therefore, a large storage capacity magneto-optical disc system can be obtained without posing any problem.

Detailed arrangements of the magneto-optical disc system given in the first embodiment will be further given in a second and third embodiments.

Figure 3:
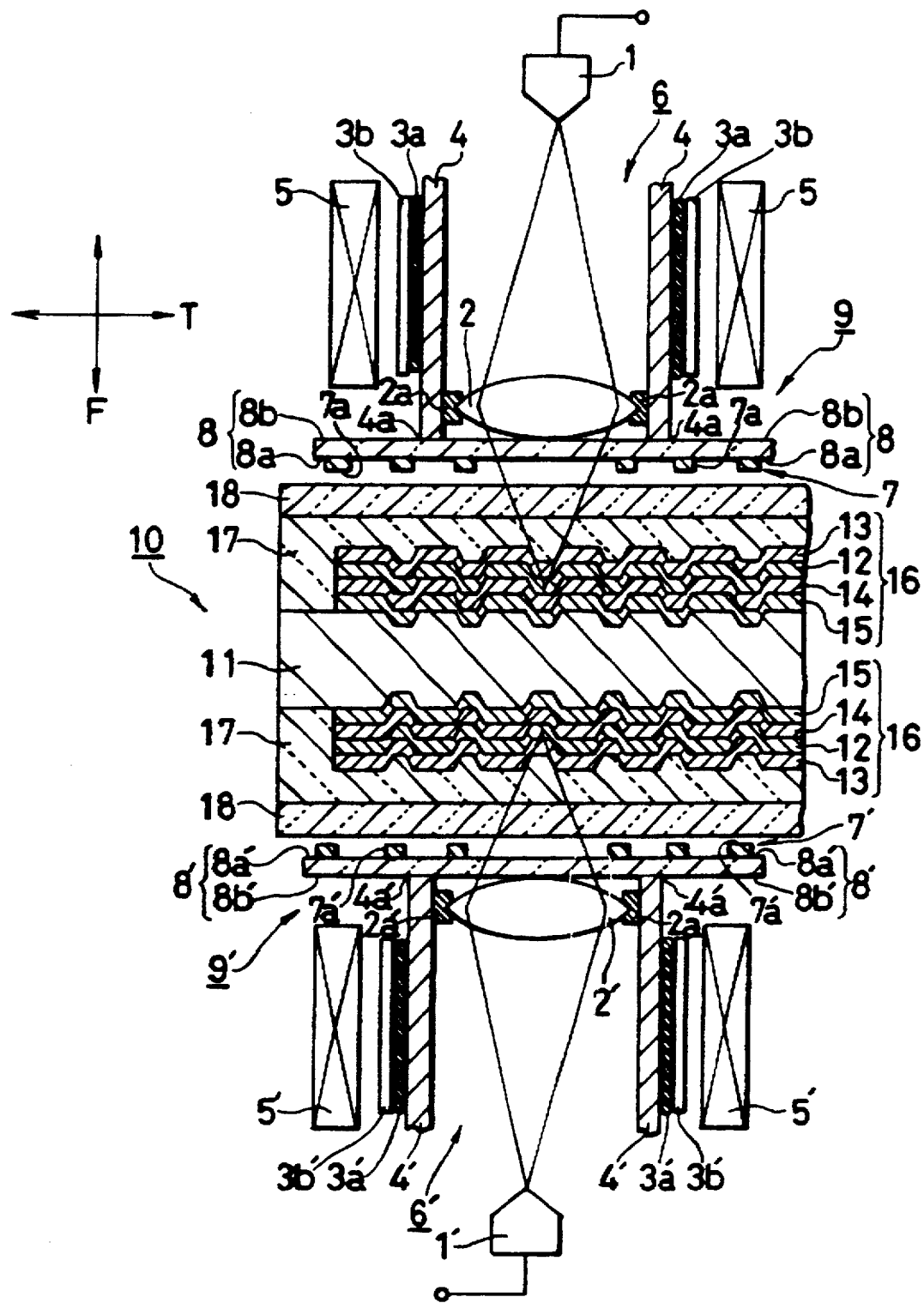
FIG. 3 is a sectional view showing an arrangement of a magneto-optical disc system according to a second embodiment of the present invention.

FIG. 3 is a sectional view of a magneto-optical disc system according to the second embodiment of the present invention.

In the second embodiment, a first and a second magneto-optical pickup units, each of which has an optical system and a magnetic system, are arranged on opposite sides of a magneto-optical recording medium 10 so as to face each other as shown in FIG. 3.

The first magneto-optical pickup unit located above the magneto-optical recording medium 10 and the second magneto-optical pickup unit located below the magneto-optical recording medium 10 are substantially the same as described below, and thus, reference numerals 1 to 9 correspond to reference numerals 1' to 9', respectively.

Each of the first and second magneto-optical pickup units of FIG. 3 comprises a pickup that is an optical system and has a laser unit 1, 1', an objective lens 2, 2' having an NA of 0.55 to 0.70, a bobbin 4, 4' on which a focus coil 3a, 3a' and a tracking coil 3b, 3b' are wound, and a magnet 5, 5' which surrounds the bobbin 4, 4', and magnetic field generating units 9, 9'.

The bobbin 4, 4' of the pickup 6, 6' is of cylindrical shape, and on the bobbin 4, 4' are wound the focus coil 3a, 3a' for driving the pickup 6, 6' in a direction of double-headed arrow F in FIG. 3, and the tracking coil 3b, 3b' for driving the pickup 6, 6' in a direction of a double-headed arrow T in FIG. 3. Lens support members 2a and 2a' are arranged adjacent to end portions 4a and 4b' of the coil bobbins 4 and 4', respectively. The objective lenses 2 and 2' for focusing the laser beams emitted from the laser units 1 and 1' are supported by the lens support members 2a and 2a', respectively.

Figure 4:
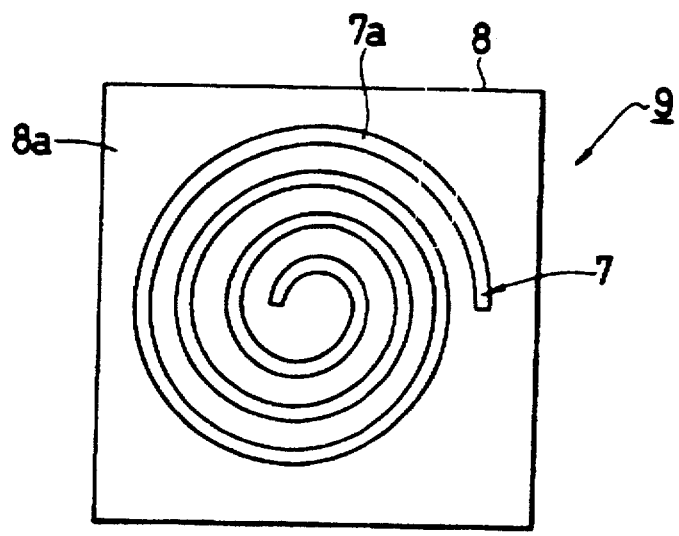
FIG. 4 is a front view of an optical glass having a coil pattern used in the magneto-optical disc systems of FIGS. 2 and 3 and a magneto-optical disc system of FIG. 5.

As shown in FIG. 4, the magnetic field generating units 9 and 9' are formed such that conductors 7a and 7a' for generating magnetic fields upon reception of currents of high-frequency signals are formed as spiral coil patterns 7 and 7' in upper surfaces 8a and 8a' of light-transmitting optical glasses 8 and 8' made of, e.g., quartz, respectively. The objective lenses 2 and 2' are positioned on lower surfaces 8b and 8b' having no coil patterns 7 and 7' of the optical glasses 8 and 8' so that the centers of the objective lenses 2 and 2' are aligned with the centers of the coil patterns 7 and 7', respectively. The objective lenses 2 and 2' are fixed near the end portions 4a and 4a' of the coil bobbins 4 and 4' through the lens support members 2a and 2a', respectively. The optical glasses 8 and 8' are adhered to fix to the end portions 4a and 4a' of the coil bobbins 4 and 4', respectively. Therefore, the laser beams can be focused on the centers of the generated magnetic fields, respectively. Thus, any centering process is not needed during assembly of the pickups.

Quartz was used as a material for the optical glasses 8 and 8', but quartz can be replaced with other materials if they have light-transmitting properties. As the coil patterns 7 and 7', printed coils, thin film coils, or the like may be used for example. Holes for transmitting laser beams from the laser units 1 and 1' may be formed in the optical glasses 8 and 8' so as to prevent the laser beams from being reflected by the surfaces of the optical glasses 8 and 8', respectively.

The first two-sided magneto-optical recording medium 10 shown in FIG. 3 is the one proposed in the specification and drawings of Japanese Patent Application No. 1-142563 filed by the present applicant. Recording portions 16, photo-curable resin layers 17, and transparent protective plates 18 are formed respectively on both surfaces of one substrate 11. Both the transparent protective plates 18 and the photo-curable resin layers 17 have light-transmitting properties and a total thickness thereof can be less than 0.6 mm.

In each of the recording portions 16, the reflecting layer 15 is provided closer to the substrate 11 than a magnetic recording layer 12, and further, the reflecting layer 15, a second dielectric layer 14, the recording layer 12, and a first dielectric layer 13 are stacked in turn from the side of the substrate 11.

In this double-sided magneto-optical recording medium 10, the substrate 11 is used in common, so that the thickness of the recording medium can be made substantially half as compared with that of a conventional double-sided magneto-optical recording medium, in which the two substrates are stuck together.

The function of the magneto-optical disc system will be described below.

In the first magneto-optical pickup unit, as a current is supplied to the focus coil 3a, the coil bobbin 4 and the magnetic field generating unit 9 integrated with the coil bobbin 4 are driven to displace along the optical axis of the objective lens 2, that is, in a direction of arrow F in FIG. 3. When a current is supplied to the tracking coil 3b, the coil bobbin 4 and the magnetic field generating unit 9 are driven to displace in a direction perpendicular to the optical axis of the objective lens 2, which is indicated by arrow T in FIG. 3.

Similarly, the second magneto-optical pickup unit is driven to displace in the directions of arrows F and T synchronously with the displacement of the first magneto-optical pickup unit.

At the same time high-frequency current of signals obtained by amplifying signals to be recorded is supplied to the coil patterns 7 and 7' of the magnetic field generating units 9 and 9', which are made of the conductors 7a and 7a', so that magnetic fields are generated, respectively. These magnetic fields are obtained by high-speed reverse controls exercised in accordance with the recording signals, and are applied to the magnetic recording layers 12 and 12' of the double-sided magneto-optical recording medium 10. The laser beams emitted from the laser units 1 and 1' are focused on areas of the magnetic recording layers 12 and 12', where the magnetic fields are applied to, through the objective lenses 2 and 2' and the light-transmitting optical glasses 8 and 8'. The temperatures of the magnetic recording layers 12 and 12' are raised over the Curie point to perform recording the information signals.

As is apparent from the above description, the magneto-optical disc system given in the embodiment is arranged such that the optical system comprising the pickup 6, 6' which has the laser unit 1, 1'; the objective lens 2, 2' and so forth, and the magnetic system comprising the magnetic field generating unit 9, 9', which is formed by providing the coil pattern 7, 7' in the optical glass 8, 8', are arranged on the same side with respect to the double-sided magneto-optical recording medium 10. Thus, the distance between the coil pattern 7, 7' and the magneto-optical recording medium 10 can be shortened. Since the thickness of the light-transmitting cover comprising the transparent protective plate 18 and the photo-curable resin layer 17 is small, the distances between the coil pattern 7, 7' and the magneto-optical recording layer 12 of the magneto-optical recording medium 10 can be reduced, so that recording in the double-sided magneto-optical recording medium by means of the magneto-optical modulation scheme can be performed, though in the conventional case, it has been difficult so far.

If the coil bobbin 4, 4' of the pickup 6, 6', and the magnetic field generating unit 9, 9', are respectively stuck together, for example, by an adhesive or the like, the center of the objective lens 2, 2' is easily aligned with the center of the magnetic field of the magnetic field generating unit 9, 9'. Since the pickup 6, 6' is interlocked with the magnetic field generating unit 9, 9' by a focus servo, the intensity of the magnetic field applied to the double-sided magneto-optical recording medium 10 can always be made constant. A drive system for driving the magnetic system, which is required in a conventional case, can be omitted. Since the space of the magneto-optical pickup unit can be saved, freedom in design can be increased.

According to the second embodiment, recording in or reproduction from the double-sided magneto-optical recording medium 10 can be variously performed. For example, if the laser units 1 and 1' and the magnetic field generating units 9 and 9' are simultaneously used, simultaneous recordings in the respective upper and lower surfaces of the double-sided magneto-optical recording medium 10 can be performed. When both the laser units 1 and 1' are simultaneously used, simultaneous reproduction can be performed. A large storage capacity recording medium can be obtained, and high-speed recording and reproduction of information signals can be performed.

After recording in or reproduction from one surface of the double-sided magneto-optical recording medium 10 is performed, recording in or reproduction from the other surface can be performed. The capacity of recording and reproduction can be doubled as compared with that of a one-sided magneto-optical recording medium.

In the above case, when recording in one surface is being performed, it is possible to put both the magnetic field generating units 9 and 9' in action, and thereby, apply the two magnetic fields to one of the magnetic recording layers 12 from above and below the layer. Thus, the recording can be made in a stronger magnetic field.

Recording can be performed by using only one of the magnetic field generating units located near one side of the medium when the recording is being performed on the other side thereof.

The third embodiment will be described below. In this embodiment, the same magneto-optical disc system as illustrated in FIG. 3 is used as shown in FIG. 5, but recording and reproduction can be performed on a second double-sided magneto-optical recording medium 30 shown in FIG. 5.

The second double-sided magneto-optical recording medium 30 was disclosed in the specification and drawings of Japanese Patent Application No. 1-274734 filed by one of the inventors of this application and other persons. In the recording medium 30, a high-permeability layer 32, a photocurable resin layer 33, a magneto-optical recording layer 34, an adhesive layer 35, and a transparent protective plate 36 are sequentially stacked on each of the surfaces of a single substrate 31. Both the transparent protective plate 36 and the adhesive layer 35 have light-transmitting properties, and a total thickness thereof is 0.6 mm or less.

The high-permeability layer 32 is made of a transition metal such as Fe, Co, Ni or the like, or an alloy of the transition metals, such as Permalloy, Sendust, or an amorphous magnetic alloy. Vertical magnetic field efficiency along the vertical direction of the double-sided magneto-optical recording medium 30 can be increased.

Figure 5:
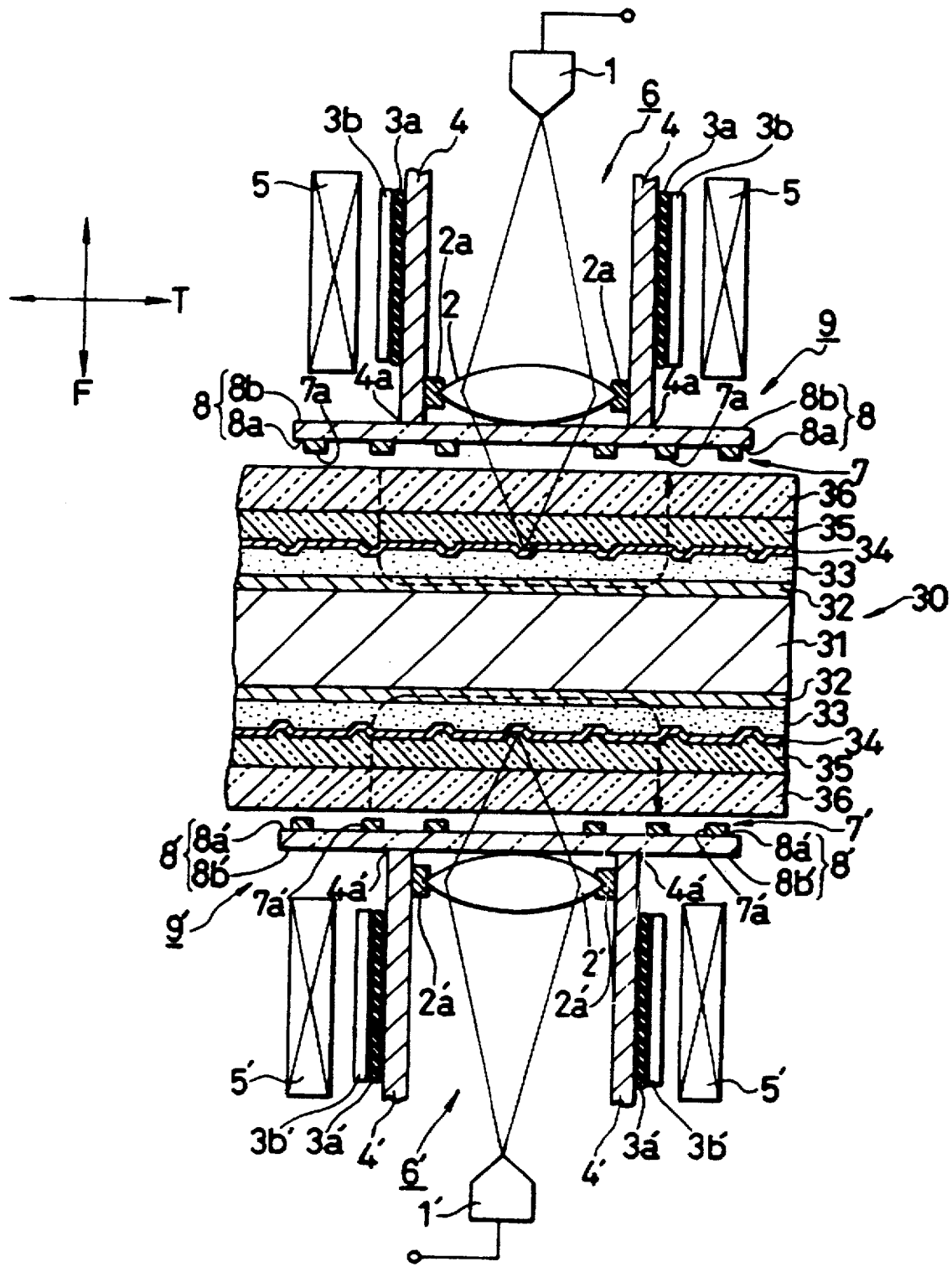
FIG. 5 is a sectional view showing the magneto-optical disc system according to a third embodiment of the present invention.

In the third embodiment, the second double-sided magneto-optical recording medium 30 has the high-permeability layer 32, so that magnetic flux from the magnetic field generating units 9 and 9' forms a closed magnetic loop as indicated by a broken line in FIG. 5 for example. In the recording mode, the magnetic flux applied to the double-sided magneto-optical recording medium 30 can thus be effectively bundled and preferably increase the vertical magnetic field efficiency.

Also in the third embodiment, recording in or reproduction from both surfaces of the double-sided magneto-optical recording medium 30 can be simultaneously performed. Further, as recording in or reproduction from one surface is performed, recording in or reproduction from the other surface can be performed.

As described above, in the second and third embodiments, the numerical aperture NA of the objective lens 2, 2' is increased as embodied in the first embodiment, so that high-density recording and reproduction are possible. At the same time, the double-sided magneto-optical recording medium can be used, so that high storage capacity, higher-speed recording and reproduction are possible. Thus, a large storage capacity magneto-optical disc system can be proposed.

In the first to third embodiments, the magnetic field generating unit 9, 9' utilized the magnetic field modulation scheme, but another scheme such as an optical modulation scheme can be utilized by the magnetic field generating unit 9, 9'.

The magneto-optical disc system is embodied in the first to third embodiments, but the present invention is not limited to such system, and applicable to an optical disc system, in which recording and/or reproduction are performed on an optical disc, an optical recording medium (including a "write-once" type optical recording medium for example) that has pits in a recording layer.

According to the optical disc system of the present invention, the NA of the objective lens for focusing the laser beam is increased, and the thickness of the light-transmitting cover of the optical disc is decreased, so that recording and/or reproduction can be performed in higher density, and large-capacity recording can be realized.

We claim:

1. An optical disc comprising:
   a recording layer for recording information thereon or reproducing information therefrom, onto which a laser beam is focused by an objective lens having a numerical aperture of 0.55 to 0.70;
   a light-transmitting cover layer for covering said recording layer and transmitting said laser beam therethrough, said light-transmitting cover layer having a thickness falling within a range of 0.6 to 0.1 mm; and
   supporting means for supporting said recording layer on one surface thereon, said supporting means being formed in a plate-like shape.

2. An optical disc according to claim 1, further including interconnecting means for interconnecting said light-transmitting cover layer and said supporting means.

3. An optical disc comprising:
   a recording layer for recording and reproduction of data, onto which a laser beam is focussed by an objective lens having a numerical aperture of 0.55 to 0.70, said recording layer being comprised of a recordable optical recording material;
   a light-transmitting cover layer for covering said recording layer and transmitting said laser beam therethrough, said light-transmitting cover layer having a thickness falling within a range of 0.6 to 0.1 mm.

4. An optical disc according to claim 3, wherein said recording layer comprises an optical recording material in which optical characteristics thereof are changed when data is recorded thereon.

5. An optical disc according to claim 3, wherein said recording layer is comprised of a rewritable-type optical recording material.

6. An optical disc according to claim 3, wherein said recording layer is comprised of an erasable-type optical recording material.

7. An optical disc according to claim 3, wherein said recording layer is comprised of a write-once and read-many-times type of optical recording material.

8. An optical disc according to claim 3, further comprising supporting means for supporting said recording layer on one surface thereon, said supporting means being formed in a plate-like shape.

9. An optical disc according to claim 8, further including interconnecting means for interconnecting said light-transmitting cover layer and said supporting means.

10. An optical disc system comprising:
    an optical disc including a recording layer comprised of a recordable optical recording material for recording data thereon and a light-transmitting cover layer covering said recording layer, said light-transmitting cover layer having a thickness falling within a range of 0.6 to 0.1 mm and transmitting a light beam therethrough; and an optical pickup unit for irradiating said light beam onto said optical disc, said optical pickup unit including a light source for radiating said light beam and an objective lens having a numerical aperture of 0.55 to 0.70 for converging said light beam radiated from said light source onto said recording layer through said light-transmitting cover layer.

11. An optical disc system according to claim 10, further including a magnetic field generation unit, and wherein a magnetic field produced by said magnetic field generation unit affects said light beam radiated from said light source according to data being recorded onto said optical disc.

12. An optical disc system according to claim 10, wherein said optical pickup unit further includes driving means for driving said objective lens in at least a direction parallel to an optical axis of said objective lens.

* * * * *